(12) United States Patent
Prestidge et al.

(10) Patent No.: US 8,464,054 B2
(45) Date of Patent: Jun. 11, 2013

(54) MEASUREMENT PROBE SYSTEMS FOR CO-ORDINATE POSITIONING APPARATUS

(75) Inventors: Tim Prestidge, Bath (GB); Jonathan Paul Fuge, Bristol (GB); Peter Kenneth Hellier, North Nibley (GB); John Styles, Bristol (GB); Jamie Buckingham, Berkeley (GB)

(73) Assignee: Renishaw PLC, Wotton-Under-Edge (GB)

( * ) Notice: Subject to any disclaimer, the term of this patent is extended or adjusted under 35 U.S.C. 154(b) by 873 days.

(21) Appl. No.: 12/216,609

(22) Filed: Jul. 8, 2008

(65) Prior Publication Data

US 2009/0070585 A1 Mar. 12, 2009

Related U.S. Application Data

(60) Provisional application No. 60/996,984, filed on Dec. 13, 2007.

(30) Foreign Application Priority Data

Jul. 26, 2007 (EP) .................................... 07252965

(51) Int. Cl.
*H04L 9/32* (2006.01)
(52) U.S. Cl.
USPC .......................................................... 713/168
(58) Field of Classification Search
USPC .......................................................... 713/168
See application file for complete search history.

(56) References Cited

U.S. PATENT DOCUMENTS

| 4,153,998 | A  | * | 5/1979  | McMurtry ........................ 33/556 |
| 4,370,721 | A  |   | 1/1983  | Berenberg et al. |
| 4,536,851 | A  |   | 8/1985  | Germanton et al. |
| 5,222,304 | A  |   | 6/1993  | Butler |
| 5,949,352 | A  |   | 9/1999  | Ferrari |
| 6,308,089 | B1 | * | 10/2001 | von der Ruhr et al. ........ 600/338 |
| 6,631,353 | B1 |   | 10/2003 | Davis et al. |
| 7,048,687 | B1 |   | 5/2006  | Reuss et al. |
| 7,145,468 | B2 |   | 12/2006 | Collingwood et al. |
| 2003/0179097 | A1 |   | 9/2003  | Collingwood et al. |

(Continued)

FOREIGN PATENT DOCUMENTS

| CN | 1450877 A    | 10/2003 |
| EP | 0 293 036 A2 | 11/1988 |

(Continued)

OTHER PUBLICATIONS

Chinese Office Action issued on Nov. 20, 2009 in corresponding Chinese Patent Application No. 200810135025.7 (with translation).

(Continued)

*Primary Examiner* — Kambiz Zand
*Assistant Examiner* — Stephen Sanders
(74) *Attorney, Agent, or Firm* — Oliff & Berridge, PLC

(57) ABSTRACT

A measurement probe, such as a touch trigger measurement probe, is described that comprises a measurement portion for measuring an object and a data transfer portion for receiving data from and/or transmitting data to an associated unit. The measurement device also comprises an authentication module for verifying the authenticity of the associated unit. The authentication module may include a processor for running a one-way hash algorithm. Authenticity may be established using a challenge and response authentication process.

16 Claims, 7 Drawing Sheets

U.S. PATENT DOCUMENTS

| | | |
|---|---|---|
| 2004/0039502 A1 | 2/2004 | Wilson et al. |
| 2004/0093495 A1 | 5/2004 | Engel |
| 2005/0028609 A1 | 2/2005 | Langemann et al. |
| 2006/0016087 A1 | 1/2006 | Schopf |
| 2006/0161054 A1 | 7/2006 | Reuss et al. |
| 2006/0250266 A1 | 11/2006 | Collingwood et al. |
| 2006/0265894 A1 | 11/2006 | Schroll |
| 2007/0033419 A1 | 2/2007 | Kocher et al. |
| 2007/0038088 A1 | 2/2007 | Rich et al. |
| 2007/0118397 A1 | 5/2007 | Williams et al. |
| 2007/0125348 A1 | 6/2007 | Aoki |

FOREIGN PATENT DOCUMENTS

| | | |
|---|---|---|
| JP | A-57-054814 | 4/1982 |
| JP | A-64-086796 | 3/1989 |
| JP | A 5-306908 | 11/1993 |
| JP | U-06-51910 | 7/1994 |
| JP | A-2000-506027 | 5/2000 |
| JP | A-2001-160106 | 6/2001 |
| JP | A-2001-296120 | 10/2001 |
| JP | A-2001-311616 | 11/2001 |
| JP | A-2004-508619 | 3/2004 |
| JP | A-2004-522961 | 7/2004 |
| JP | A-2004-233194 | 8/2004 |
| JP | A-2006-511860 | 4/2006 |
| JP | A-2009-008429 | 1/2009 |
| WO | WO 00/61003 A1 | 10/2000 |
| WO | WO 02/17048 A2 | 2/2002 |
| WO | WO 02/063235 A2 | 8/2002 |
| WO | WO 03/021182 A1 | 3/2003 |
| WO | WO 2004/057552 A1 | 7/2004 |
| WO | WO 2007/028964 A1 | 3/2007 |

OTHER PUBLICATIONS

"Protecting the R&D Investment—Two-Way Authentication and Secure Soft-Feature Settings", Application Note 3675, Dallas Semiconductor, Maxim, Oct. 24, 2005.
Mar. 9, 2011 Search Report issued in European Patent Application No. EP 08252273.
Mar. 11, 2011 Search Report issued in European Patent Application No. EP 08252268.
Jul. 12, 2011 Office Action issued in Japanese Patent Application No. 2008-193409, with translation.
Apr. 12, 2009 Office Action issued in Chinese Patent Application No. 200810135023.8, with translation.
U.S. Appl. No. 12/219,513, in the names of Tim Prestidge et al., filed Jul. 23, 2008.
U.S. Appl. No. 12/216,576, in the names of Tim Prestidge et al., filed Jul. 8, 2008.
Nov. 18, 2010 Office Action issued in U.S. Appl. No. 12/219,513.
Jul. 6, 2011 Office Action issued in U.S. Appl. No. 12/219,513.
Jun. 29, 2011 Office Action issued in U.S. Appl. No. 12/216,576.
Dec. 22, 2010 Office Action issued in U.S. Appl. No. 12/216,576.
Jul. 20, 2010 Office Action issued in U.S. Appl. No. 12/216,576.
Office Action issued in Japanese Patent Application No. 2008-193436 dated May 24, 2011 (with translation).
Jan. 26, 2012 Office Action issued in U.S. Appl. No. 12/219,513.
Feb. 24, 2012 Office Action issued in U.S. Appl. No. 12/216,576.
Aug. 31, 2012 Office Action issued in Japanese Application No. 2008-193436 (with translation).
Aug. 17, 2012 Office Action issued in Japanese Patent Application No. 2008-193409 (with translation).
Aug. 17, 2012 Office Action issued in U.S. Appl. No. 12/219,513.
Final Rejection issued Feb. 27, 2013 in U.S. Appl. No. 12/219,513.

* cited by examiner

MEASUREMENT PROBE SYSTEMS FOR CO-ORDINATE POSITIONING APPARATUS

This nonprovisional application claims the benefit of U.S. Provisional Application No. 60/996,984, filed Dec. 13, 2007.

BACKGROUND OF THE INVENTION i) Field of the Invention

The present invention relates to measurement devices that comprise an authentication module for verifying the authenticity of an associated unit and in particular to measurement systems that comprise a measurement probe mountable to co-ordinate positioning apparatus.

ii) Description of Related Art

Measurement probes for use with co-ordinate positioning apparatus, such as co-ordinate measuring machines, machine tools, inspection robots etc, are known. Examples of such measurement probes are described in US4153998, WO2004/57552 and WO2007/28964.

To offer flexibility to users, measurement devices for use with co-ordinate positioning apparatus are often produced and sold as discrete modular units that are combined to establish a system that can perform the required measurement task. For example, a range of different measurement probes are often produced for use with a number of measurement probe interfaces. An appropriate measurement probe and probe interface can then be used in combination by an end user. For machine tool based probing applications, data transfer between the measurement probes and probe interface may take place over a wireless (e.g. RF or optical) link using a communications protocol such as that described in WO2004/57552 or WO2007/28964.

Although providing such modular apparatus offers the advantage of increased flexibility, it has the disadvantage that ill-informed users may attempt to combine measurement probe products that are in some way incompatible. Furthermore, the communication protocols of existing wireless communication systems can typically be easily copied thereby allowing third parties to produce devices that attempt to mimic genuine devices. The quality of such third party devices can be highly variable and the compatibility of such devices with genuine articles is typically not properly tested. The combination of incompatible apparatus, or the use of apparatus from unauthorised third party manufacturers, can thus result in measurement systems being established that do not provide an acceptable level of measurement accuracy.

SUMMARY OF THE INVENTION

According to a first aspect of the present invention, a measurement probe system is provided that comprises a measurement probe mountable to co-ordinate positioning apparatus, the measurement probe comprising a measurement portion for measuring an object. The measurement probe system also comprises a data transfer portion for receiving data from and/or transmitting data to an associated unit and is characterised in that it comprises an authentication module for verifying the authenticity of the associated unit.

The present invention thus relates to a measurement probe system comprising a measurement probe that can be mounted to co-ordinate positioning apparatus, such as a machine tool, co-ordinate measuring machine (CMM) or inspection robot etc. The measurement probe has a measurement portion for use in measuring properties of an object, such as the location of points on the object surface or dimension(s) of the object. The measurement probe system also comprises a data transfer portion that allows data to be passed to and/or read from an associated unit and includes an authentication module for checking that the associated unit which is communicating with the data transfer portion is authentic. As explained in more detail below, if the authenticity of the associated unit is confirmed the measurement probe system may allow data (e.g. firmware updates, trigger counts, operational instructions etc) to be loaded and/or measurement data from the measurement portion may be transmitted to the associated unit.

In this manner, the present invention ensures that any associated unit is authentic. This means that there is no requirement for a user to have to check or verify that an associated unit is fully compatible with the measurement probe system. Furthermore, it prevents third parties manufacturing associated units that can mimic the operation of an authentic device. In this manner, it is guaranteed that the measurement probe system is always used with fully compatible apparatus thereby ensuring the required levels of measurement accuracy are maintained.

Advantageously, the authentication module comprises a processor that, in use, runs an encryption algorithm. The processor is advantageously a stand-alone chip or circuit but may also be used for other processing tasks if required. Conveniently, the encryption algorithm is a one-way hash algorithm, such as the SHA-1 algorithm developed by the National Institute of Standards and Technology (NIST) of the USA. Although SHA-1 is a suitable algorithm, it should be noted that many alternative algorithms are available and could be used if required. The authentication module conveniently comprises a random data string generator which, as described in more detail below, can greatly increase the security of a challenge and response authentication process. A secure memory for storing a secret key may also be provided, the secure memory being inaccessible externally after the key has been entered.

Advantageously, the authentication module verifies the authenticity of the associated unit using a challenge and response process. The challenge and response process conveniently confirms that the associated unit holds the same secret key as the secure memory of the authentication module without disclosing the secret key.

The challenge and response process is described in more detail below and comprises the authentication module of the measurement probe system communicating with a similar authentication module of the associated unit. The authentication modules of the measurement probe system and the associated unit both combine the same data (e.g. a message and a random data string) with their secret key and use the SHA-1 algorithm to generate a message authenticity code (MAC). If the measurement probe system receives the same MAC from the associated unit as it has calculated internally, it can be sure that the associated unit stores the same secret key as the measurement probe system. In this manner, the authenticity of the associated unit can be verified by the measurement probe system.

The associated unit may be located remotely to the measurement probe system and a wireless link provided for communication therebetween. The data transfer portion thus conveniently comprises a transmitter and/or a receiver for providing a wireless communications link with an associated unit. The data transfer portion may thus provide an optical, RF or other suitable type of wireless communications link as required. Alternatively, the data transfer portion may comprise at least one electrical contact for providing a conductive electrical connection with an associated unit. In such an example, the associated unit may be brought into electrical contact with the electrical contact(s) of the measurement probe system as and when required. If the data transfer portion and any associated electrical contacts are provided on the measurement probe, a cover or lid may be provided to protect such contacts and/or any attached associated unit from physical damage.

Advantageously, the measurement portion generates measurement data for transmission to an associated unit by the data transfer portion, wherein the data transfer portion only transmits the measurement data if the authentication module has verified the presence of an authentic associated unit. For example, the associated unit may be a probe interface for conveying measurement data to a computer controller. In such an example, the measurement probe is only operable if the probe interface is confirmed as authentic. Alternatively, the measurement probe system may also comprise the probe interface and the associated unit may comprise a computer controller (e.g. a numeric controller and/or personal computer). In such an example, the probe interface may pass measurement data to the computer controller only if the computer controller (or a hardware component, such as a dongle, attached to the computer controller) is confirmed as authentic. In a further embodiment, the measurement probe system may comprise the measurement probe, a probe interface and a portion of a computer controller. In this case, the associated unit may comprise a further portion of the computer controller and optionally hardware (e.g. a dongle) connected to the that computer controller. Measurement data may then only be passed from a measurement program running on the computer controller to a further program that uses such data if the associated unit (e.g. the dongle) is confirmed as being authentic.

As well as, or instead of, receiving measurement data the associated unit may comprise data that can be transferred to the measurement probe system. For example, the associated unit may comprise an activation button, smart card, control fob or similar that includes a store of trigger credits or contains updates to the software that is being run by the measurement probe system. In other words, data may be stored by the associated unit. The associated unit may thus be advantageously arranged to transmit information relating to operation of the measurement probe system. Conveniently, any such transmitted information is only acted upon by the measurement probe system if the authentication module has verified that the associated unit is authentic. In this manner, it can be assured that any data that is uploaded to, and acted upon, by the measurement probe system is authentic.

The measurement probe may be of contact or non-contact type. If a contact measurement probe is provided, the measurement portion may comprise a deflection measurement mechanism and/or a deflectable stylus. The measurement probe may be a touch trigger probe that issues a trigger signal whenever stylus deflection exceeds a certain threshold. Alternatively, the measurement probe may be an analogue or scanning probe in which the amount of stylus deflection is measured (e.g. using strain gauges) and an output is provided containing information about the position of the stylus tip relative to the body of the measurement probe. In either case, the stylus may be releasably retained by a stylus holder that forms part of the deflection measurement mechanism thereby allowing stylus replacement.

The measurement probe system described above may comprise solely a measurement probe. In such an example, the measurement probe preferably comprises the data transfer portion and the authentication module. Alternatively, the measurement probe system may also comprise one or more additional components. For example, the system may conveniently comprise one or more of a probe interface, a numeric controller and a control computer. In such an example, the data transfer portion and the authentication module may be distributed over different components of the system.

The present invention also extends to a measurement kit that includes a measurement probe system of the type described above and an associated unit. The associated unit and measurement probe system preferably both store an identical (secret) key. Advantageously, the associated unit is a probe interface for receiving (e.g. over a wireless link) measurement data from the measurement probe of the measurement system. Conveniently, the associated unit stores information (e.g. trigger count or other operational data) to be transmitted to the measurement probe.

A measurement probe system is thus described herein that comprises a measurement probe having a measurement portion for measuring an object and a data transfer portion for receiving data from and/or transmitting data to an associated unit, wherein the system also comprises a processor that, in use, runs an encryption algorithm. An authentication process or a full data encryption architecture may be provided.

According to a second aspect of the invention, a probe interface is provided for a measurement probe system comprising a measurement probe having a data transfer portion as described above. The probe interface also comprising a complimentary data transfer portion for receiving measurement data from a measurement probe and an output portion for outputting the measurement data, characterised in that the interface comprises an authentication module for verifying the authenticity of the measurement probe.

According to a third aspect of the invention, a method of measurement probe system operation comprises the steps of: (i) using a measurement probe system to measure an object and (ii) receiving data from and/or transferring data to an associated unit, characterised in that the method comprises the further step (iii) of verifying the authenticity of the associated unit.

According to a further aspect of the invention, a measurement probe for co-ordinate positioning apparatus is provided, the measurement probe comprising; a measurement device for generating measurement data indicative of the position of at least one point on the surface of an object; a communications device for communicating with a remote probe interface; and an authentication device for determining if the remote probe interface is an authentic remote probe interface, wherein the communications device passes the measurement data to the remote probe interface only when the authentication device has determined that the remote probe interface is an authentic remote probe interface.

Advantageously, the authentication device comprises a secure memory for storing a secret key. The authentication device may thus determine the authenticity of a remote probe interface using a challenge and response authentication process, the challenge and response authentication process confirming that a remote probe interface holds the same secret key as is held in the secure memory of the authentication module. Such a challenge and response authentication process preferably does not disclose the secret key.

According to a further aspect of the invention, a measurement probe for co-ordinate positioning apparatus is provided, the measurement probe comprising; a measurement device for measuring an object; an interface for providing a data connection with an associated data storage unit; a communications device for receiving data from an associated data storage unit connected to the interface; an authentication device for determining if a data storage unit connected to the interface is an authentic data storage unit; wherein data stored on a data storage unit connected to the interface is used by the measurement probe only when the authentication device has determined that the data storage unit connected to the interface is an authentic data storage unit.

Advantageously, the communications device receives data from an associated data storage unit that comprises at least one of a trigger count value, a probe operation time value, a probe operating instruction and a firmware update. Preferably, the authentication device comprises a secure memory for storing a secret key. Conveniently, the authentication device determines the authenticity of a data storage unit using a challenge and response authentication process, the challenge and response authentication process confirming that a data storage unit holds the same secret key as is held in the secure memory of the authentication module. Such a challenge and response authentication process preferably does not disclose the secret key.

Although a measurement probe system is described in detail above, the arrangement described herein may also be applied to many different types of measurement apparatus; e.g. the measurement portion may comprise a Raman spectrometer or similar for acquiring data from objects provided in the form of samples. A measurement device is thus described herein that comprises a measurement portion for measuring an object and a data transfer portion for receiving data from and/or transmitting data to an associated unit, wherein the device comprises an authentication module for verifying the authenticity of the associated unit. The measurement device may comprise so-called dimensional measurement devices for measuring a physical dimension of an object (e.g. measurement probes, optical position encoders etc) or non-dimensional measurement devices for measuring a property of an object other than a dimension (e.g. Raman spectrometers, Fourier transform infrared spectrometers etc).

BRIEF DESCRIPTION OF THE DRAWINGS

The invention will now be described, by way of example only, with reference to the accompanying drawings in which.

DETAILED DESCRIPTION OF THE PREFERRED EMBODIMENTS

Figure 1:
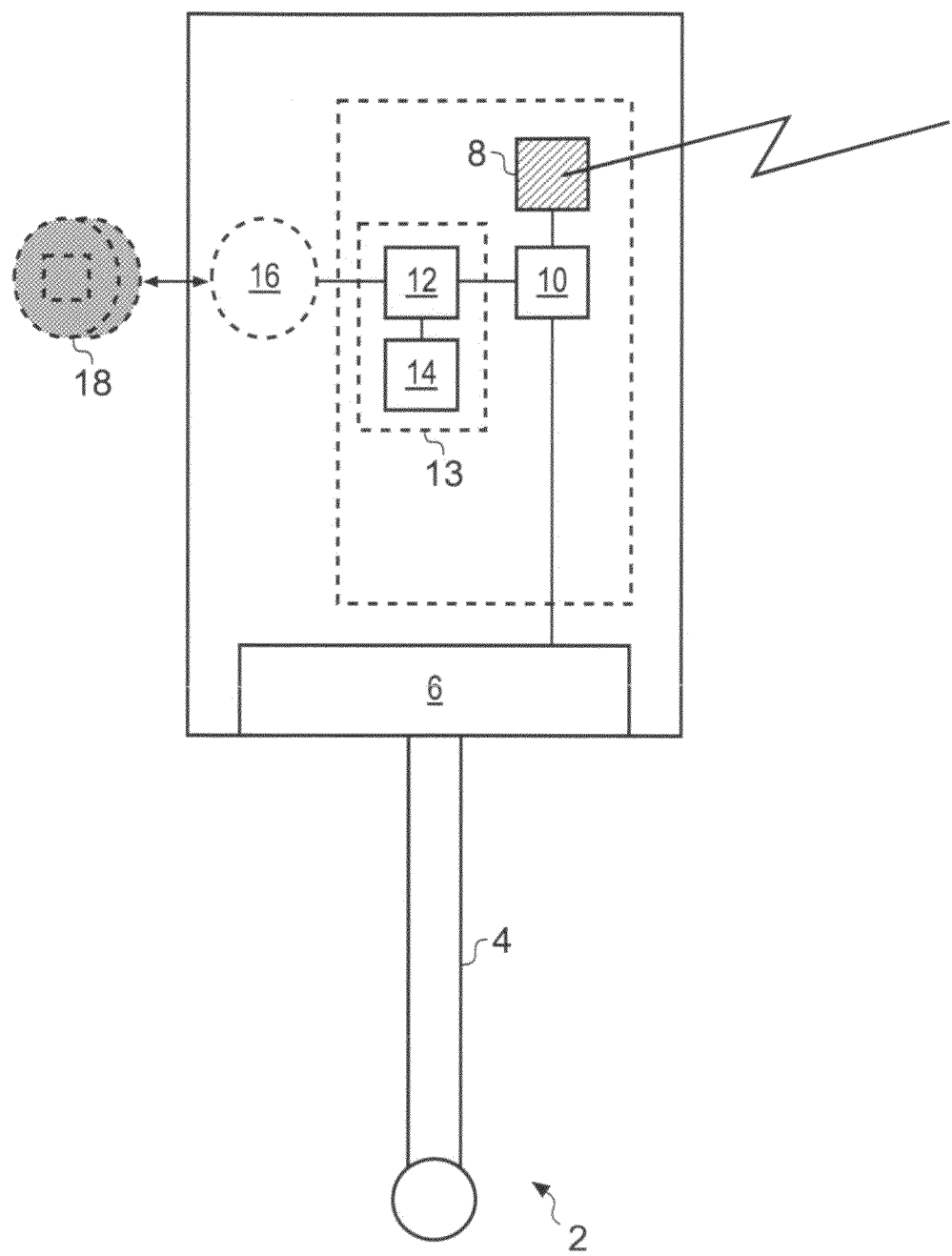
FIG. 1 shows a measurement probe and activation button according to the present invention.

Referring to FIG. 1, a measurement probe 2 of the present invention is shown. The measurement probe 2 is a so-called touch trigger probe having a deflectable stylus 4 releaseably attached to a deflection measurement unit 6. The deflection measurement unit 6 is of known type and comprises a stylus holder mounted to the measurement probe housing via a set of balls and rollers. Deflection of the stylus causes disengagement of the balls from the rollers thereby breaking an electrical circuit and producing a so-called trigger signal. The measurement probe 2 comprises a wireless (RF) communications unit 8 for transmitting trigger signal data to a remote probe interface (not shown) in a known manner. Although a wireless RF link is described herein, it should be noted that any type of wired or wireless link may be used. For example, the RF communications unit 8 could be substituted for an optical communications unit.

The measurement probe 2 also comprises a deactivation device 10. The deactivation device 10 is arranged to prevent normal operation of the measurement probe if certain criteria are not met. Deactivation of the measurement probe may be implemented in a number of ways. For example, the deactivation device 10 could force the measurement unit 6 to power down or enter some kind of standby mode. Alternatively, the measurement probe could continue to produce trigger signals as normal but the transfer of trigger signal data to the remote interface via the wireless communications unit 8 could be blocked. In short, the deactivation device 10 is arranged to stop normal measurement probe operation thereby making the measurement probe inoperable. The measurement probe also includes an authentication module 13 that comprises an authentication device 12 and associated electronic memory 14. An externally accessible electrical connection pad 16 is also provided that allows electrical connections between the authentication module 13 and an associated activation button 18 to be established. It should be noted that the measurement probe will typically include various additional components (e.g. filtering or data processing electronics, batteries etc) but these are not shown for clarity.

Figure 2:
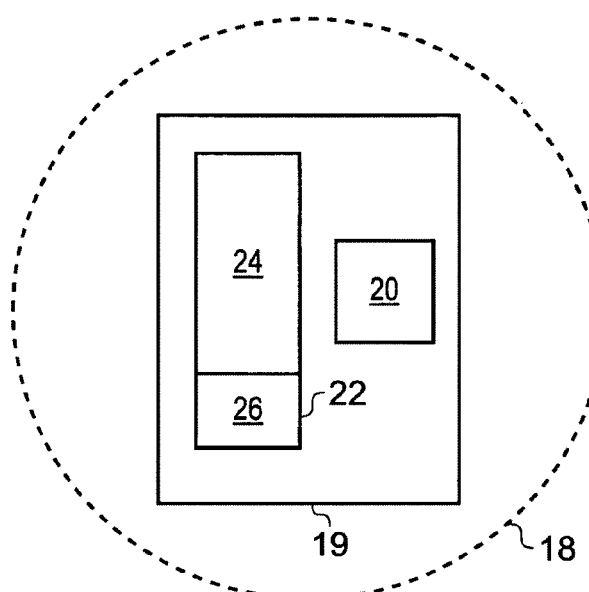
FIG. 2 shows the components of the activation button in more detail.

Referring now to FIG. 2, the activation button 18 is shown in more detail. The activation button 18 includes an authentication module 19 comprising an authentication device 20 and an electronic memory 22. The memory 22 comprises a permanent memory portion 24 and a rewritable memory portion 26 for storing a trigger count value.

Referring to both FIGS. 1 and 2, operation of the measurement probe 2 with an activation button 18 attached will be described.

Firstly, a two-way authentication process is used to verify the authenticity of the measurement probe 2 and the activation button 18. Details of a suitable authentication technique are described in more detail below with reference to FIG. 3, but the basic principle is that a secret key is stored in the electronic memories 14 and 24 of the measurement probe 2 and the activation button 18. The authentication device 12 of the measurement probe 2 and the authentication device 20 of the activation button 18 communicate with one another to perform an authentication check which, without disclosing the secret key, confirms that the electronic memories of the measurement probe 2 and the activation button 18 hold the same secret key.

Once the measurement probe 2 has established that an authentic activation button 18 is attached to its external electrical connection pad 16, the trigger count value stored in the rewritable memory portion 26 of the activation button is read by the measurement probe. If the trigger count value is non-zero, the deactivation device 10 permits normal measurement probe operation. Thereafter, the trigger count value stored in the rewritable memory portion 26 is decremented by one for each trigger signal that is generated by the measurement probe. It should be noted that the trigger count value stored in the rewritable memory portion 26 of the activation button 18 may be decremented after each trigger signal is issued or the measurement probe 2 may have some kind of temporary memory buffer (e.g. part of the memory 14) for storing trigger counts and means for periodically updating the main trigger count value stored in the rewritable memory portion 26 of the associated activation button. For example, the trigger count value stored in the rewritable memory portion 26 may be updated at regular time intervals or whenever a certain number (e.g. ten, fifty, one hundred etc) of trigger signals have been issued by the measurement probe. The use of a memory buffer within the measurement probe reduces the required number of updates to the value stored in the rewritable memory portion 26 of the activation button. However, any buffer is preferably not too large because the main count stored by activation button may not be decremented properly if the activation button is removed prior to an update event.

A measurement probe of the present invention thus operates normally in the presence of an activation button 18 containing a non-zero trigger count; i.e. the measurement probe issues a trigger signal whenever the stylus is deflected. However, removal of the activation button 18 or the reduction of the stored trigger count to zero causes the deactivation device 10 to stop normal probe operation thereby preventing measurements being made with the measurement probe. In this manner, the operational lifetime of the measurement probe can be set by a manufacturer. For example, a measurement probe may be sold with an activation button that stores a certain trigger count value (e.g. five or ten thousand trigger counts). After the trigger count is expended, a further activation button may be obtained from the manufacturer to reactivate the measurement probe. The new activation button may be provided with instructions for verifying the measurement probe is operating within the necessary tolerances and/or any appropriate firmware updates for the measurement probe may be provided with the replacement activation button. In this manner, the requirement to periodically refresh the measurement probe can also have the advantage of forcing a user to periodically update or check the operational performance of the measurement probe thereby ensuring the required measurement accuracy is maintained.

Although FIG. 1 illustrates a measurement probe 2 having an authentication module 13, an electrical contact pad 16 and a deactivation device 10, it should be noted that such components may alternatively or additionally be provided as part of the remote probe interface. In such an example, the measurement probe may pass all measurement data to such a probe interface and the probe interface may then only pass on measurement data (e.g. to a machine controller) if an authentic activation button storing a non-zero trigger count is attached to its electrical contact pad. As a further alternative, the measurement probe may include the authentication module and an electrical contact pad for reading a trigger count from an activation button whilst the probe interface may comprise a deactivation device. The data transmitted by the probe to the interface may then contain information that indicates whether an authentic activation button storing a non-zero trigger count is attached to the electrical contact pad of the measurement probe. If the measurement probe provides an indication that there is no authentic activation button storing a non-zero trigger count attached thereto, the deactivation device of the probe interface may be arranged to prevent the output of any measurement data.

It should be noted that although the above examples work by storing and decrementing a trigger count value, other values could be stored and measured. For example, the measurement probe could include a clock that measures the length of time that the measurement probe is actively operating. In such an example, the activation button could then include a certain operational time value that is decremented by the operational time value accrued as the measurement probe operates. A combination of time and trigger count values could also be used. For example, the activation button could store separate counts related to the time of operation and the number of triggers. The deactivation device 10 could then allow normal measurement probe operation until the stored trigger count or the stored time of operation count is expended. It should also be noted that the trigger count could alternatively increment with use and the deactivation device could stop normal operation when a maximum count value is reached. Although the above described activation button includes a memory for storing some kind of count or time value this is by no means essential. The activation button could, for example, alternatively comprise a clock or similar that separately measures elapsed time.

Figure 3:
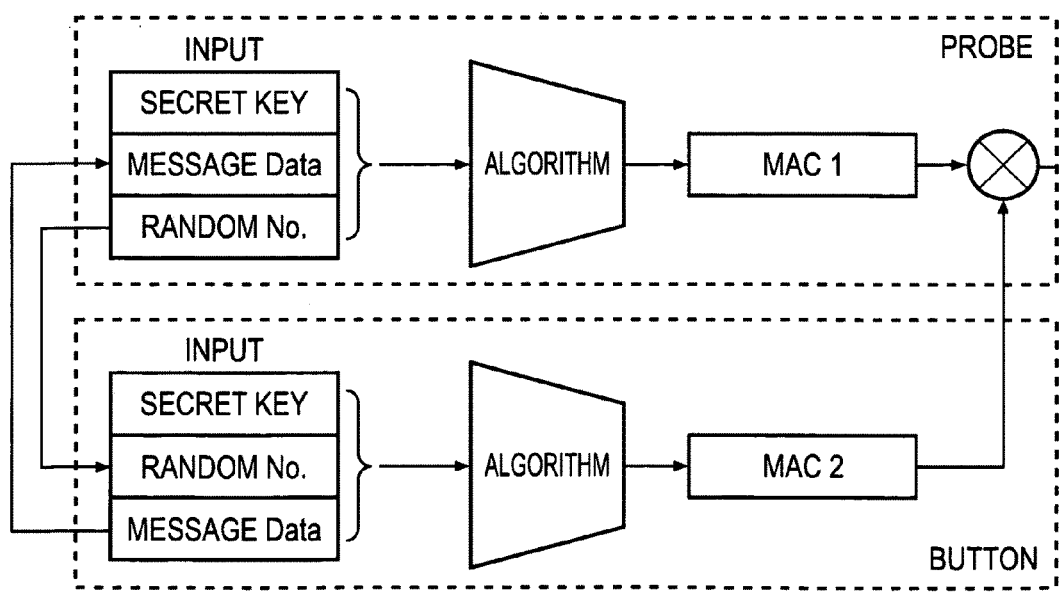
FIG. 3 illustrates the principles behind a two-way authentication process.

Referring now to FIG. 3, the basic principle of the two way authentication technique employed by the apparatus described with reference to FIGS. 1 and 2 is illustrated.

As outlined above, the measurement probe 2 and the activation button each include an authentication device. Each authentication device runs the SHA-1 algorithm developed by the National Institute of Standards and Technology (NIST) of the USA. The SHA-1 algorithm is a so-called one-way hash function that generates a fixed length Message Authentication Code (MAC) from input data. The SHA-1 algorithm has the properties of being irreversible; i.e. it is computationally infeasible to determine the input that corresponds to a generated MAC. The algorithm is also collision-resistant such that it is impractical to find more than one input message that produces a given MAC. Furthermore, the algorithm has a high avalanche effect meaning that any minor change in the input produces a significant change in the MAC that is generated. Although use of the SHA-1 algorithm is described in detail herein, it should be noted that many alternative algorithms could be used to implement similar types of authentication.

The two-way authentication process, which can also be termed challenge and response authentication, relies on the measurement probe and activation button both storing the same secret key in a secure (i.e. externally inaccessible) memory. When authentication is required, for example when an activation button is located in the electrical contact pad 16 of the measurement probe, the activation button sends message data (e.g. the activation button serial number plus the stored trigger count value) to the measurement probe. The message data contains no secret information and there is no threat to the security of the authentication process if the message is intercepted. The measurement probe responds by sending a random data string as a "challenge" to the activation button.

The measurement probe then applies its SHA-1 algorithm to an input that includes the secret key, the message data and the random data string and produces a MAC therefrom; this MAC can be termed MAC1. The activation button takes the same input data (i.e. the secret key, the message data and the random data string) and uses its SHA-1 algorithm to generate a MAC; this MAC can be termed MAC2. The measurement probe then compares MAC1 and MAC2. If MAC2 matches MAC1 it is certain (to a very high level of confidence) that the same secret key is stored by both the measurement probe and the activation button. The measurement probe then assumes that the activation button is genuine. It should be reemphasised that the authentication process does not compromise the secrecy of the secret key; i.e. the secret key itself is never passed between devices.

A similar two-way authentication check is also performed before data is written to the rewritable memory 26 of the activation button 18. In such a process, the activation button 18 generates the random number and performs the MAC comparison. This authentication process prevents the security of the activation button 18 being compromised by ensuring that only an authentic device (such as measurement probe 2) can alter the stored trigger count value. In other words, the authentication check guards against unauthorised users tampering with the trigger count value that is stored by the activation button 18.

A number of authentication devices suitable for incorporation into a measurement probe are available commercially and are described in more detail elsewhere. For example, suitable apparatus is the Maxim/Dallas i-button available from Maxim Integrated Products Inc, Sunnyvale, Calif., USA.

Figure 4:
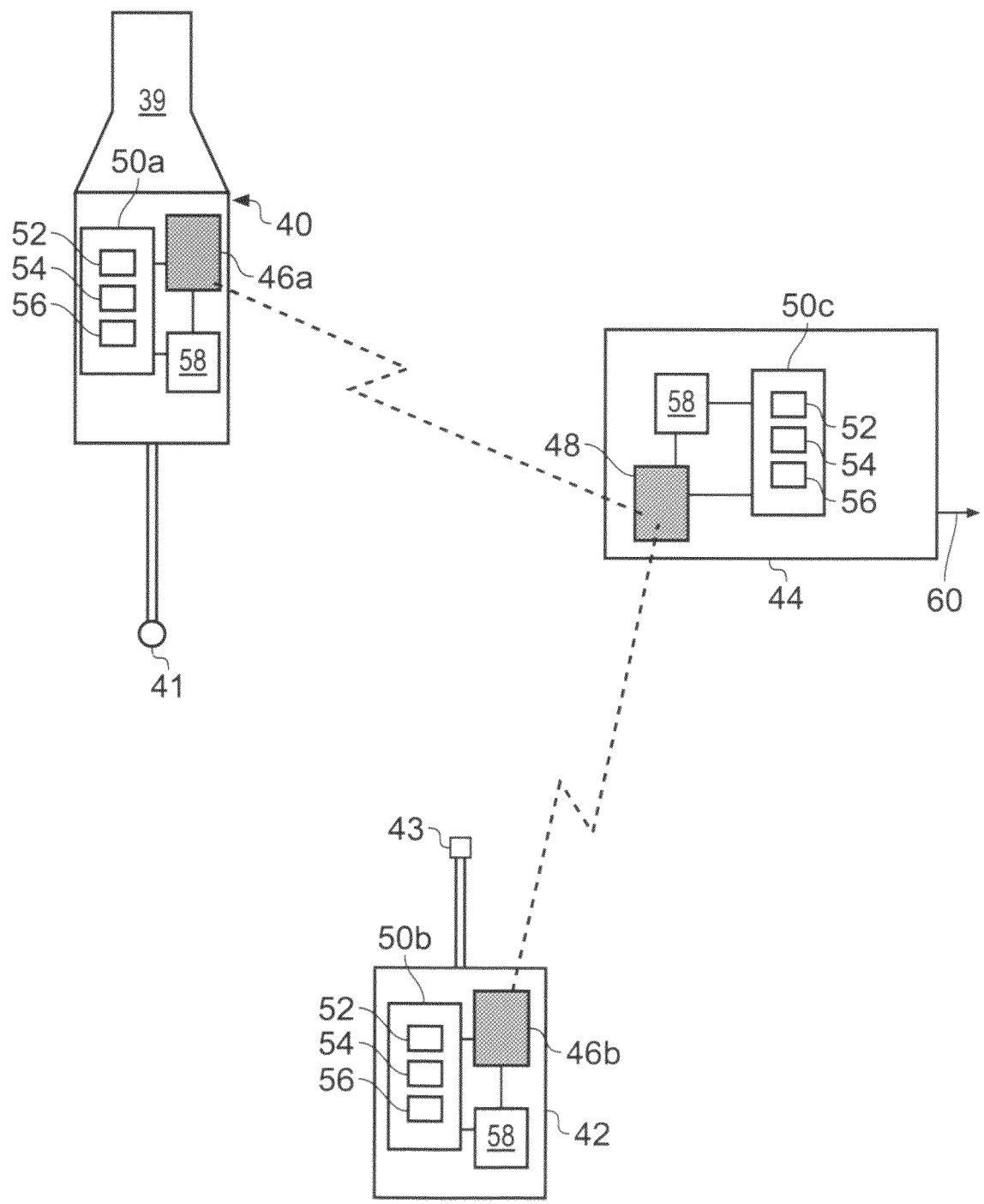
FIG. 4 shows a measurement probe kit for use on a machine tool.

Referring to FIG. 4, measurement kit for use with a machine tool is illustrated. The measurement kit comprises a spindle mountable measurement probe 40, a table top (tool setting) measurement probe 42 and a probe interface 44. The spindle measurement probe 40 and the table top measurement probe 42 (which are hereinafter collectively termed the measurement probes) communicate with the probe interface 44 over a wireless radio frequency (RF) link. The measurement probes 40 and 42 are both touch trigger probes that issue a trigger signal whenever stylus deflection exceeds a certain threshold value. The trigger signal can be used to freeze machine position information; e.g. the location of the spindle can be determined in the x, y and z machine co-ordinates system as measured by machine position encoders. The spindle mountable measurement probe 40 has a spindle mountable shank 39 and a stylus having a ruby ball tip 41; this allows points to be measured on the surface of a workpiece. The table top measurement probe 42 has a tool setting cube 43 mounted to its stylus tip and is used to determine the position of cutting tools held by the machine tool spindle. For clarity, the associated machine tool on which such apparatus could be used is not shown in FIG. 4.

In order to overcome the various problems associated with hardwired measurement probe systems, the interface 44 communicates with the measurement probes 40 and 42 via a spread spectrum wireless RF link. To allow multiple systems to operate side by side, each measurement probe prefixes all of its data transmissions with a probe identification (ID) code. An initial "pairing" procedure is performed in which the interface 44 learns the ID code of the measurement probe that is intended for use with that particular interface. After pairing, the interface 44 will only process received data that contains the ID code of the paired measurement probe thereby ensuring that data transmissions are ignored that originate from any other measurement probes (i.e. probes having different ID codes) that may be in the vicinity. Once paired, the measurement probe and interface will frequency hop in a predefined manner to mitigate the effects of noise from other RF sources. More details about the spread spectrum, or frequency hopping, communications link are outlined in WO2004/57552. A variant of WO2004/57552 is also described in detail in PCT application WO2007/28964. The apparatus of WO2007/28964 allows multiple probes to be paired to a single interface by allowing the probe IDs of a measurement probe to be set by a user or by allowing the interface to recognise transmissions that contain any one of a plurality of different ID codes. Such an arrangement allows two or more probes to be used (non-concurrently) with a single interface.

To implement the frequency hopping RF link mentioned above, the spindle mounted measurement probe 40 and the table top measurement probe 42 each comprise wireless communications units 46*a*-46*b*. The interface 44 includes a corresponding wireless communications unit 48 for communicating with the communications unit 46 of a measurement probe. In normal use, the wireless communications units 46 and 48 allow data transfer between any one of the measurement probes 40 and 42 and the paired interface 44 in the known manner outlined above.

The interface 44, spindle measurement probe 40 and table top measurement probe 42 contain authentication modules 50*a*-50*c*. Each authentication module 50 comprises an authentication device 52 for running the SHA-1 hash algorithm, a secure memory portion 54 for storing a secret key and a random data string generator 56. The interface 44 and the measurement probes 40 and 42 also comprise deactivation devices 58*a*-58*c* for inhibiting normal operation. As outlined above, deactivation may be implemented in various way; for example, a deactivated measurement probe may not transmit trigger signals via the wireless communications unit whilst a deactivated interface may not output any data on its trigger signal output line 60.

In use, a set-up routine is performed in which a measurement probe (e.g. spindle mountable probe 40) and the interface 44 are placed in "pairing" mode. In common with systems of the type described in WO2004/57552, the pairing procedure involves the measurement probe repeatedly transmitting its ID code. The interface searches for any ID codes transmitted by an unpaired probe and, when the relevant measurement probe ID code is received, it is stored by the interface. After pairing, the interface ignores any data it receives that does not contain the stored ID code. As outlined in WO2007/28964, the interface may also be paired with a further measurement probe (e.g. the table top measurement probe 42) by storing a second probe ID code or by loading the stored probe ID code into the further measurement probe. It can be seen that a potential weakness of such a pairing procedure is that it allows any components to be paired so long as the requirements of the communication protocol are met. The communications protocol can, however, be easily copied which would allow replica or incompatible measurements probes and/or interfaces to be used with genuine ones. This can seriously and unpredictably degrade the measurement performance of the kit.

As outlined above, the probes and interfaces of FIG. 4 also include authentication modules 50 having a secure memory portion 54 in which a secret key is stored. After a measurement probe has been paired with the interface, an authentication step is performed in which the measurement probe verifies that the interface is authentic (i.e. that it stores the same secret key) and vice versa. The challenge and response authentication process is analogous to that described with reference to FIG. 3, with each authentication device 52 applying its SHA-1 algorithm to input data that includes the secret key stored in its associated secure memory portion 54, a message (e.g. the probe ID code) and a random data string generated by one of the random data string generators 56. Exchanges of the MACs, messages and random data strings are performed using the wireless communications units 46. If the measurement probe or interface confirms, by comparing self-generated and received MACs, that it has been paired with a genuine counterpart (i.e. a counterpart storing the same secret key) normal operation of the apparatus is permitted.

However, if a probe or interface fails to establish the authenticity of its counterpart, the deactivation device 58 prevents normal operation.

The authentication process described above may be performed only after pairing, each time a measurement probe is turned-on, at predetermined time intervals and/or during periods in which measurements are not being acquired. If required, the authentication process may also be performed before the pairing operation. In this manner, it is ensured that authentic measurement probes only ever operate normally with authentic interfaces and vice versa. Apparatus of this type can thus guarantee, to a high level of certainty, that only fully compatible measurement probes and interfaces can be used in combination. Providing an authentication process of this type thus prevents an interface being used with a certain type of measurement probe if that interface is unable to properly process the measurement probe data it receives because, for example, the format of the received data differs to that expected by the interface or requires the application of different processing techniques. The authentication process thus means that, for example, a manufacturer can provide different ranges of measurement probes and interfaces that use the same communications protocols. Compatible equipment can be assigned a common secret key, whilst it is ensured that incompatible equipment stores different secret keys. In this manner, the user is unable to use incompatible equipment in combination thereby reducing the chances of apparatus malfunction and/or the introduction of unacceptably large measurement errors. Such an arrangement also prevents third party, possibly inferior quality, apparatus being used with authentic devices which again ensures that measurement accuracy is not compromised.

Although by no means essential, the measurement probes 40 and 42 shown in FIG. 4 may be measurement probes of the type described above with reference to FIG. 1. In particular, each measurement probes may comprise a deactivation device (which may be the same or different to the deactivation device 58) that only permits normal probe operation if an authentic activation button storing a non-zero trigger count value is attached to an electrical connection pad provided on the measurement probe. In such an arrangement, the kit will only operate normally if the interface and measurement probes are authentic and if the measurement probes each have an authentic activation button attached thereto that contains a non-zero trigger count.

The measurement probe described with reference to FIG. 1 includes an external electrical connection pad 16 for receiving an activation button. In certain circumstances it is, however, preferable for the activation button to be sealed inside the measurement probe during use. This ensures that the activation button does not become accidentally detached from the measurement probe or damaged; this may occur, for example, during the process of loading a spindle probe into the machine tool spindle using an automated tool change device. A measurement probe may thus be provided that includes a separate, preferably sealable, compartment for receiving the activation button. Alternatively, the battery retaining compartment of the measurement probe may be adapted to also hold the activation button as will now be described in more detail.

Figure 5:
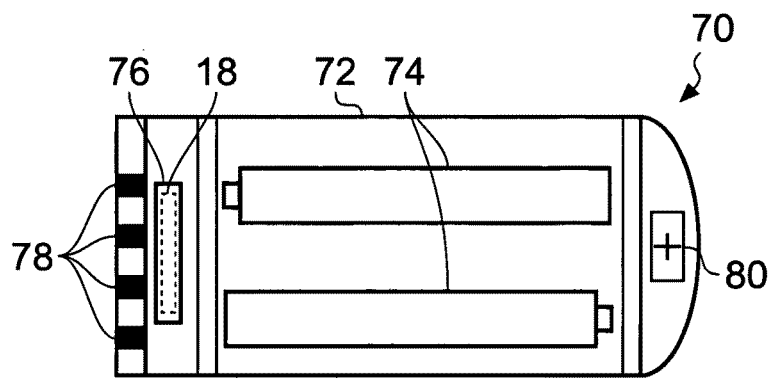
FIG. 5 shows an integrated battery and activation button holder.

Referring to FIG. 5, a battery holder 70 for a measurement probe is illustrated. The battery holder 70 includes a compartment 72 in which batteries 74 are located. In addition, a slot 76 is provided in which an activation button 18 can be placed. Electrical contacts 78 are also provided for establishing the necessary electrical connections between the batteries and activation button and the electronics of the measurement probe. A locking mechanism 80 may also be provided to securely retain the battery holder 70 in the probe body. This arrangement ensures good electrical contact is maintained even in a harsh operating environment and also prevents damage to the activation button.

The battery holder of FIG. 5 also has the advantage that removal of the activation button also requires removal of the batteries. This ensures that the probe is powered down whenever the activation button is removed. In such apparatus, the authentication process need only be performed on power-up of the measurement probe because it is impractical to remove or replace the activation button after the measurement probe has been switched on.

It is important to note that the use of an activation button as described above provides a convenient way to implement the invention but is by no means the only solution. In other words, the use of an activation button of the type described above is advantageous but by no means essential. Many alternative types of device could be used to securely store a trigger count and implement some kind of authentication or encryption technique. For example, a smart card or other similar device may be used.

Figure 6:
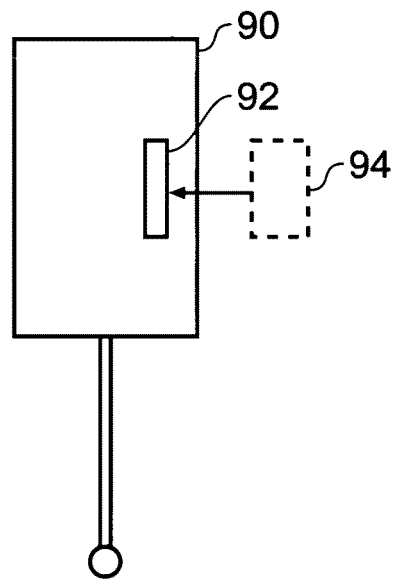
FIG. 6 shows a measurement probe having a slot for receiving a smart card.

Referring to FIG. 6, a measurement probe 90 is illustrated that comprises a slot 92 for receiving a smart card 94. The slot 92 may be sealable. The smart card 94 includes a memory to store a secret key, a processor for implementing the SHA-1 algorithm and a rewritable memory for storing a trigger count value. The measurement probe contains complimentary apparatus such that a challenge and response authentication process of the type described above can be carried out between the measurement probe and smart card. If required, the slot 92 for the smart card may be formed as part of the battery holder thereby physically protecting the card from damage.

The measurement probes described above are arranged to operate only when an activation button, smart card or similar device storing a trigger count data is attached to the probe. It is, however, also possible for the measurement probe itself to comprise a rewritable memory that stores the trigger count value. The activation button (or similar) is then only required when the trigger count stored in the probe needs to recharged or refreshed.

Figure 7:
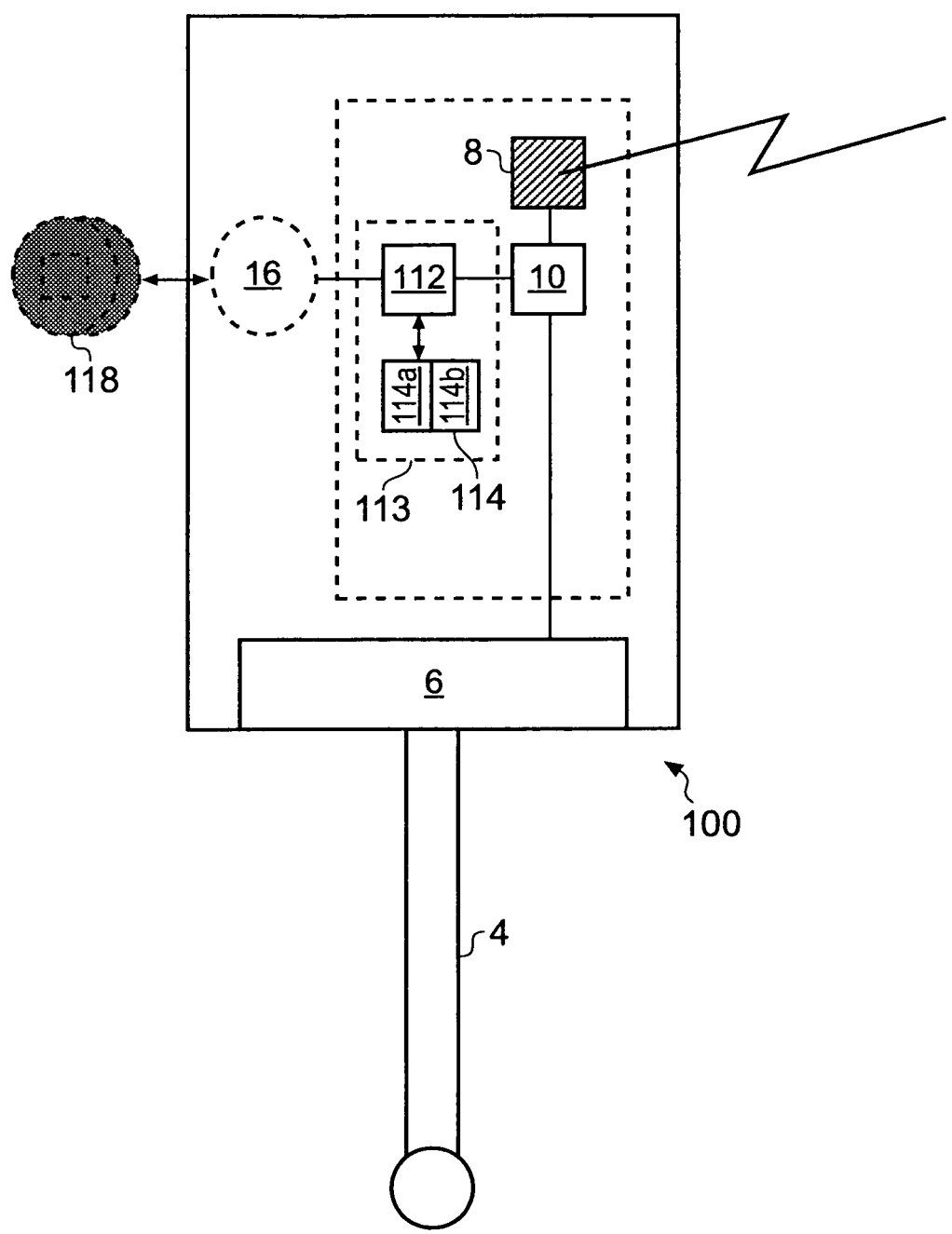
FIG. 7 shows a measurement probe having an integral memory for storing a trigger count value.

Referring to FIG. 7, a measurement probe 100 is shown that is a variant of the measurement probe of FIG. 1. In common with the measurement probe described with reference to FIG. 1, the measurement probe 100 comprises a deflectable stylus 4 attached to a deflection measurement unit 6, a wireless communications unit 8 for communicating with a remote interface and a deactivation unit 10. An electrical connection pad 16 provides a connection to an associated activation button 118.

The measurement probe also comprises an authentication module 113 comprising an authentication device 112 and a memory 114. The memory 114 stores a secret key in a permanent memory portion 114a and also includes a rewritable portion 114b for storing a trigger count value. In use, the deactivation unit 10 only permits normal measurement probe operation when the trigger count value stored in the rewritable memory portion 114b is non-zero. Each time a trigger signal is generated, the count stored in the rewritable memory portion 114b is decremented accordingly. Once the stored trigger count value reaches zero, normal measurement probe operation is inhibited by the deactivation unit 10.

In order to reactivate the measurement probe, an activation button 118 storing a non-zero trigger count is placed in contact with the electrical contact pad 16. The above described authentication process is then used to ensure that both the measurement probe and the activation button contain the same secret key. Once authenticity has been established, trigger counts are transferred or loaded from the activation button to the measurement probe. In other words, the trigger count stored in the rewritable memory of the activation button is decremented by a certain value and, at substantially the same time, the trigger count value held in the rewritable memory portion 114b is increased by that value. Following the loading of trigger counts, the activation button can be removed from the measurement probe. In this manner, trigger count credits are transferred in bulk from the activation button 18 to the measurement probe 100 thereby allowing continued operation of the measurement probe until the new trigger count is expended.

The measurement probe 100 may be configured to take all the trigger counts that are stored in the activation button 118. Alternatively, the measurement probe 100 may be configured to take fewer trigger counts than are stored in the activation button. If necessary, the transfer of trigger counts may also be performed in the opposite direction. For example, trigger counts may be transferred from the measurement probe 100 back to an activation button 118. Alternatively, the activation button 118 may be arranged such that the trigger count can only ever be decremented. It should also be noted that the activation button 118 may be identical to the activation button 18 and hence may also be used with the measurement probe 2 described with reference to FIG. 1.

The activation button described above is designed to be brought into physical contact with corresponding electrical contact pads of the measurement probe. As mentioned above, activation buttons are simply one way of implementing the invention and many different types of secure technologies (smart cards etc) could be connected to the measurement probe and used for the same purpose. Furthermore, if the measurement probe itself is capable of securely storing trigger count values, additional methods of refreshing the trigger counts stored in the measurement probe can be implemented.

Figure 8:
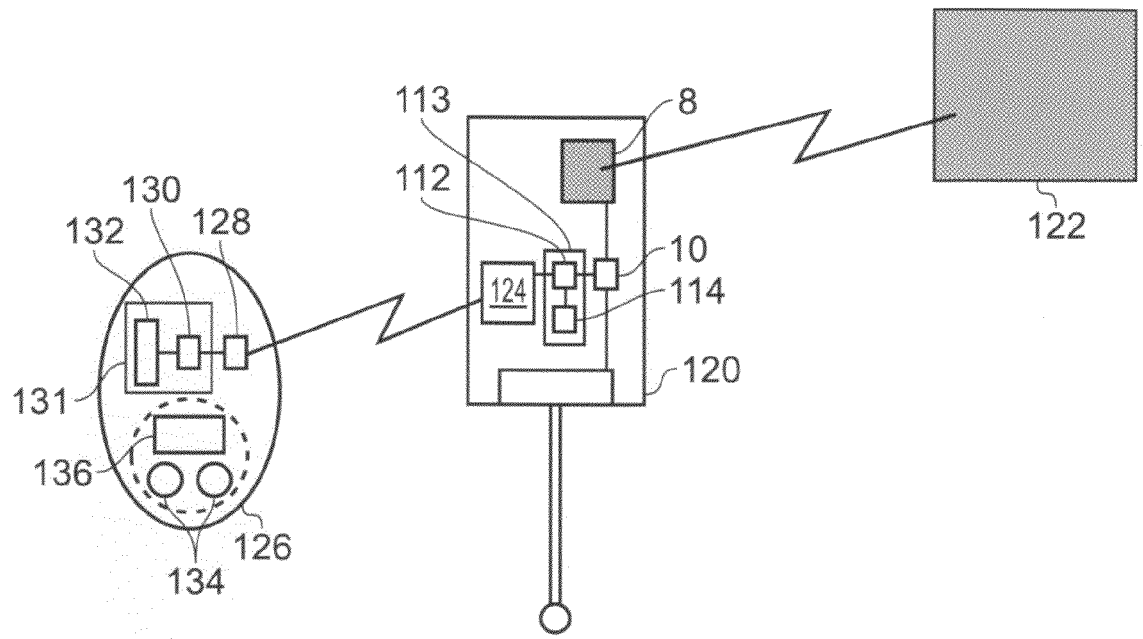
FIG. 8 shows a measurement probe and an associated activation fob.

Referring to FIG. 8, a further measurement probe 120 is shown. The measurement probe 120 includes a wireless communications unit 8 for passing trigger information to a remote probe interface 122 over a wireless RF link. The RF link may be as described previously in WO2004/57552 or may be arranged to implement an authentication process as described above with reference to FIG. 4. The measurement probe 120 also includes a further wireless communications unit 124 that is connected to an authentication module 113 that comprises an authentication device 112 and a secure memory 114. The physical electrical contact pad 16 of the measurement probe 100 described with reference to FIG. 7 is thus replaced in the measurement probe 120 by the wireless communications unit 124.

A separate fob 126 is also provided that includes a wireless communications unit 128 for communicating with the wireless communications unit 124 of the measurement probe 120. The communications unit 128 of the fob 126 is linked to an authentication module 131 comprising an authentication device 130 and an electronic memory 132 having a secure portion for storing the secret key and a rewritable portion for storing a trigger count value. The fob also includes a plurality of keys 134 that allow a user to control the transmission process. A liquid crystal display 136 is provided for displaying fob status information such as the number of trigger counts remaining and/or the number of counts to be loaded into the measurement probe.

In use, a user selects the number of trigger counts that are to be uploaded to a measurement probe using the keys 134. The fob is then placed in the vicinity of the relevant measurement probe 120 and a key is pressed to initiate the trigger count upload. The challenge-response authentication process is performed over the wireless link to verify that the fob 126 and the measurement probe 120 are authentic. After a successful authentication step, the selected number of trigger counts are transferred from the memory 132 of the fob 126 to the memory 114 of the measurement probe. The use of a wireless link means that the measurement probe 120 does not have to include accessible electrical contacts; the count stored by the measurement probe 120 can thus be updated without having to touch or in any way access the measurement probe.

To ensure that the probe triggers are uploaded to the desired measurement probe, it is preferred that the RF communications link between the fob 126 and the measurement probe 120 is a relatively short range link (e.g. operable only over distances of less than 20 cm or so). Alternatively, an optical link may be used instead of the RF link. If an optical link is provided, the directionality of the transmitted light can be used to ensure that trigger counts are uploaded to the correct probe. Although separate communications units are shown for communicating with the probe interface and the fob, it should also be noted that a single wireless communications unit may be used to perform both functions.

Although a dedicated fob 126 is described, the measurement probe may be interfaced with a general purpose computer (e.g. a laptop or PDA) via a standard wireless communications link (e.g. Wi-Fi, Bluetooth etc) or a wired link (USB, Firewire etc). In such an embodiment, the computer may also be interfaced to an encryption module or card that runs the authentication check, securely stores the secret key and maintains a probe trigger count value. In other words, an activation button or chip type device may be provided that communicates with the measurement probe via an intermediate (general purpose) device.

Figure 9:
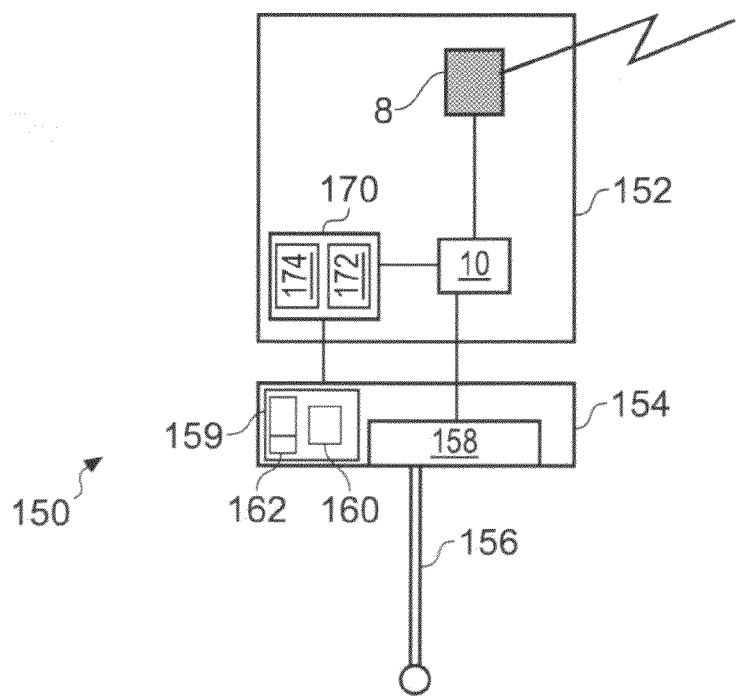
FIG. 9 illustrates two-part measurement probe apparatus.

Referring to FIG. 9, a two-part measurement probe 150 will now be described. The measurement probe comprises an upper part 152 and a lower part 154. The lower part 154 comprises a stylus 156 attached to a deflection measurement unit 158. The lower part 154 also includes an authentication module 159 comprising an authentication device 160 and an associated memory 162. The memory 162 comprises a secure portion for storing a secret key and a rewritable portion for storing a trigger count value. The upper part 152 comprises a wireless communications unit 8 for communicating with an associated probe interface (not shown) and a deactivation device 10 for inhibiting normal operation. The upper part also includes an authentication module 170 comprising an authentication device 172 and a memory portion 174 for storing a secret key.

The upper and lower parts may be assembled to form a measurement probe. Once assembled, electrical links are provided between the upper and lower parts by appropriate sets of electrodes (not shown). After assembly, a challenge and response authentication process of the type described above is performed in order to verify that the upper and lower parts of the device are authentic. If authenticity is confirmed, the deactivation device 10 allows trigger events from measurement unit 158 to be output via the wireless communications unit 8 provided that there are still trigger counts stored in the memory 162 of the lower part. Each trigger event decrements the stored count and when the trigger count value equals to zero, the deactivation device 10 of the upper part 152 prevents further operation with that particular lower part 154 attached. The lower part is then discarded and replaced with a new lower part (i.e. a lower part having stored trigger counts).

The lower part 152 can thus be considered as the combination of an activation button to store a trigger count and the (moving) mechanical parts of the measurement probe. All the moving parts that will wear with use are thus contained in the (disposable) lower part of the measurement probe, whereas the bulk of the (expensive) electronics are contained in the re-usable upper part. The number of trigger counts initially stored in the memory of the lower part may correspond to, or be slightly less than, the expected operational lifetime of the stylus or deflection measurement unit 158. In other words, the lower part may store a trigger count value that causes operation of the measurement probe to cease before the measurement probe fails or its measurement accuracy decreases to unacceptable levels. In this manner, the accuracy of measurements from the two-part measurement probe system can be assured.

The above embodiments use an authentication process which offers a high level of flexibility in that any authentic components can be used in combination. For example, trigger count credits stored by activation buttons can be transferred to any number of authentic measurement probe. This has the advantage of allowing activation buttons to be swapped between different measurement probes as required. Although such flexibility in using trigger counts is advantageous, it may be desirable to provide non-transferable trigger counts in certain circumstances.

Figure 10:
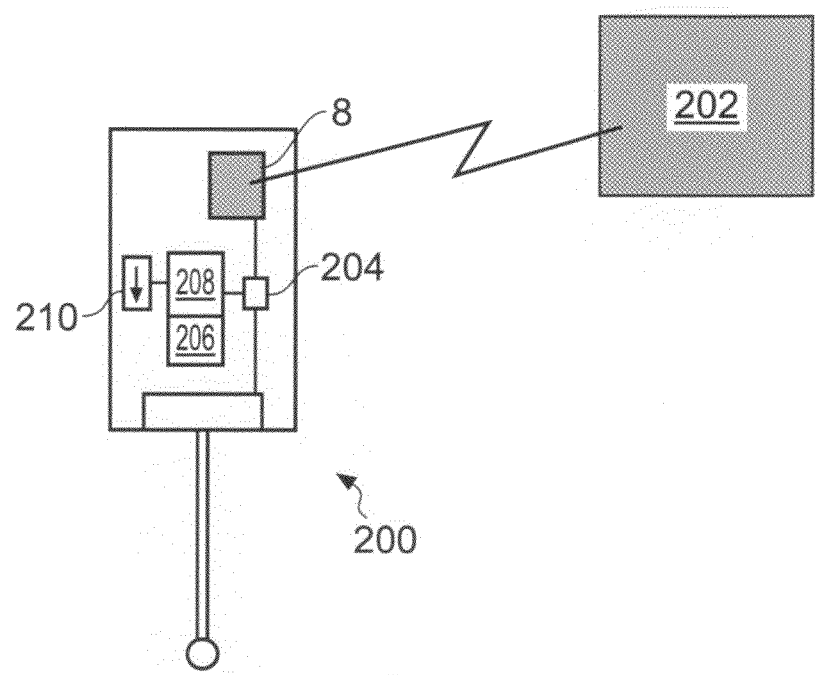
FIG. 10 shows a measurement probe storing a plurality of trigger count release codes.

Referring to FIG. 10 an alternative measurement probe 200 is illustrated. The measurement probe 200 comprises a wireless (RF) communications unit 8 for transmitting data to a remote probe interface 202. In addition, a deactivation device 204 is provided to stop normal measurement probe operation when the trigger counts stored in a rewritable memory portion 206 are expended. The measurement probe also includes a secure memory portion 208 that securely stores a number of (secret) pre-programmed codes for releasing further trigger counts. Entering a code that matches a stored code will thus increase the stored trigger count by a certain amount. These release codes are known only to the manufacturer and are sufficiently complex to ensure that it is not practically possible to find such codes by a trial and error process. The codes are also unique to the particular measurement probe; the measurement probe being identifiable by a unique probe identification or serial number.

The measurement probe 200 is thus supplied with a certain number (e.g. five or ten thousand) of trigger counts already stored in its rewritable memory. The stored trigger count reduces with probe use in the manner described above. When the trigger count reaches, or approaches, zero an appropriate release code can be acquired from the manufacturer. Entry of a release code that matches a stored code causes the release of further trigger counts thereby permitting continued operation of the apparatus. Each release code can only be used once to increase the trigger count.

The measurement probe 200 also comprises an interface 210 via which the release codes can be input. The interface may comprise one or more keys into which a code is typed. Alternatively, the interface may comprise a wireless link to a remote device (such as a fob) into which the appropriate code has been entered. Alternatively, the interface may receive data via a stylus deflection data entry process such as the trigger logic technique described previously in U.S. Pat. No. 7,145, 468. Alternatively, the interface may establish a link (e.g. by telephone or over the internet) to a computer server of an authentic manufacturer, distributor or retailer etc. On receipt of appropriate payment, the necessary code may then be passed over the link to the measurement probe thereby reactivating the measurement probe.

It should also be noted that measurement probes may be provided in which the secure memory portion storing the trigger count can not be accessed after manufacture. In such a case, the measurement probe will only work for the preset number of triggers before becoming permanently inoperable.

The probe may then be disposed of, or returned to the manufacturer for refurbishment. Although the above examples describe topping up a trigger count value, it is also possible for the measurement probe to be switched into a permanent (i.e. not trigger count or time limited) mode of operation. For example, an activation button or release code may be provided that permanently deactivates the deactivation device such that the measurement probe operates from that point forward as a standard measurement probe.

The above described embodiments all relate to measurement probe apparatus. It is, however, important to note that the same techniques could be applied to a wide range of other measurement apparatus. For example, the technique may be applied to any dimensional measuring apparatus such as position encoder systems, co-ordinate measuring machines, scanning apparatus etc. The techniques may also be used with non-dimensional measuring apparatus such as spectroscopy kits.

Figure 11:
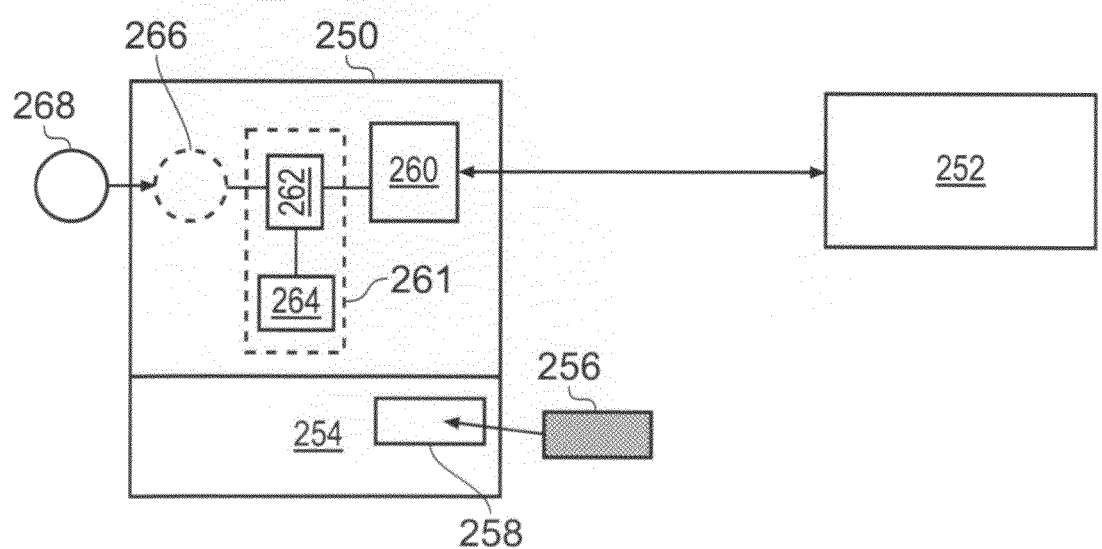
FIG. 11 illustrates application of the invention to non-dimensional measurement apparatus.

Referring to FIG. 11, a Raman spectroscopy system is illustrated in which a Raman spectrometer 250 is interfaced to a computer 252. The spectrometer 250 comprises a measurement unit 254 that is arranged to acquire, under the control of the computer 252, Raman spectra from samples 256 placed on a sample stage 258. The spectrometer 250 also comprises a deactivation device 260 that can prevent measurement data being passed to the computer 252. The deactivation device 260 is linked to an authentication module 261 comprising an authentication device 262 and a secure memory 264 in which a secret key is held. An electrical contact pad 266 for receiving an activation button 268 is also provided. The activation button 268 may be the same as that described with reference to FIG. 2, with the stored count value relating to measurement counts rather than trigger counts.

In use, the activation button 268 storing a number of measurement counts is placed on the electrical contact pad 266. In the manner described above, the authentication module 261 of the spectrometer communicates with the corresponding authentication module of the activation button 268. If the activation button 268 is found to be authentic and also holds a non-zero measurement count, the deactivation unit 260 allows normal spectrometer operation. If the activation button 268 is not authentic, or if it hold no measurement counts, the deactivation device 260 prevents normal spectrometer operation. In this manner, a spectrometer can be provided which can perform a certain number of measurements before a replacement activation button is required. The number of counts provided on an activation button may be linked to the number of measurements that can be taken before recalibration or servicing of the device is necessary, thereby ensuring operation does not occur when the spectrometer may be out of calibration. As described above, a variant of the apparatus may be provided in which measurement counts are uploaded to a secure memory store within the spectrometer.

It should be noted that herein the term "authentic" is used to describe devices that store the relevant secret key and does not necessarily relate to the origin of the manufactured device. In particular, the authentication process may allow only certain models of measurement probe to be paired with certain models of interface thereby preventing measurement probes and interfaces that are not designed to be operable with one another being used in combination.

It should also be remembered that the examples described above with reference to the associated drawings are only examples of the present invention. A skilled person would be aware of the many alternatives and variations of the above examples that would be possible. In particular, the various authentication modules, authentication devices, electronic memories etc described above are illustrated as separate functional blocks. These functions may be provided by discrete chips or circuits or may be implemented as parts of a computer program running on a general purpose computing module. The above examples should thus be seen as in no way limiting the physical manner in which the invention is implemented.

We claim:

1. A measurement probe system comprising a measurement probe mountable to co-ordinate positioning apparatus and a probe interface,
the measurement probe comprising a measurement portion for measuring an object and a first data transfer portion for communicating with the probe interface, the measurement portion comprising a deflectable stylus and a deflection measurement mechanism for measuring deflection of the deflectable stylus,
the probe interface comprising a first authentication module for verifying the authenticity of the measurement probe,
wherein the measurement probe system further comprises a second data transfer portion for receiving data from and/or transmitting data to an associated data storage unit, wherein the measurement probe system comprises a second authentication module for verifying the authenticity of the associated data storage unit.

2. A measurement probe system according to claim 1, wherein at least one of the first authentication module and the second authentication module comprises a processor that, in use, runs an encryption algorithm.

3. A measurement probe system according to claim 2, wherein the encryption algorithm is a one-way hash algorithm.

4. A measurement probe system according to claim 1, wherein at least one of the first authentication module and the second authentication module comprise a random data string generator.

5. A measurement probe system according to claim 1, wherein at least one of the first authentication module and the second authentication module comprise a secure memory for storing a secret key.

6. A measurement probe system according to claim 5, wherein the second authentication module verify the authenticity of the associated data storage unit using a challenge and response process, wherein the challenge and response process confirms that the associated data storage unit holds the same secret key as the secure memory of the second authentication module without disclosing the secret key.

7. A measurement probe system according to claim 1, wherein the first data transfer portion comprises a transmitter and/or a receiver for providing a wireless communications link with the probe interface.

8. A measurement probe system according to claim 1, wherein the second data transfer portion comprises at least one electrical contact for providing a conductive electrical connection to an associated data storage unit that can be attached to the measurement probe system.

9. A measurement probe system according to claim 1 in which the deflection measurement mechanism of the measurement portion generates measurement data for transmission to the probe interface by the first data transfer portion, wherein the measurement probe comprises a third authentication module for verifying the authenticity of the probe interface and the first data transfer portion only transmits the measurement data to the probe interface if the third authentication module has verified the presence of an authentic probe interface.

10. A measurement probe system according to claim 1, wherein the associated data storage unit is arranged to transmit information relating to measurement probe system operation, wherein said information is only acted upon by the measurement probe system if the second authentication module has verified that the associated unit is authentic.

11. A measurement probe system according to claim 1, further comprising at least one of a numeric controller and a computer.

12. A measurement kit comprising a measurement probe system according to claim 1 and an associated data storage unit, wherein the associated data storage unit stores information to be transmitted to the measurement probe system.

13. A measurement probe for co-ordinate positioning apparatus, the measurement probe comprising;
a measurement device for generating measurement data indicative of the position of at least one point on the surface of an object;
a first communications device for communicating with a remote probe interface; and
a first authentication device for determining if the remote probe interface is an authentic remote probe interface,
wherein the first communications device passes the measurement data to the remote probe interface only when the authentication device has determined that the remote probe interface is an authentic remote probe interface,
wherein the measurement probe also comprises an interface for providing a data connection with an associated data storage unit, a second communications device for receiving data from an associated data storage unit connected to the interface, and a second authentication device for determining if a data storage unit connected to the interface is an authentic data storage unit;
wherein data stored on a data storage unit connected to the interface is used by the measurement probe only when the authentication device has determined that the data storage unit connected to the interface is an authentic data storage unit.

14. A measurement probe according to claim 13 wherein the first authentication device comprises a first secure memory for storing a first secret key, wherein the first authentication device determines the authenticity of the remote probe interface using a challenge and response authentication process, the challenge and response authentication process confirming that a remote probe interface holds the same first secret key as is held in the first secure memory of the first authentication module, wherein the challenge and response authentication process does not disclose the first secret key.

15. A measurement probe according to claim 13 wherein the second communications device receives data from an associated data storage unit that comprises at least one of a trigger count value, a probe operation time value, a probe operating instruction and a firmware update.

16. A measurement probe according to claim 13 wherein the second authentication device comprises a second secure memory for storing a second secret key, wherein the second authentication device determines the authenticity of a data storage unit using a challenge and response authentication process, the challenge and response authentication process confirming that a data storage unit holds the same second secret key as is held in the second secure memory of the second authentication module, wherein the challenge and response authentication process does not disclose the secret key.

* * * * *